(12) United States Patent
Boesgaard

(10) Patent No.: US 8,201,248 B2
(45) Date of Patent: Jun. 12, 2012

(54) AUTHENTICATING A WEB PAGE WITH EMBEDDED JAVASCRIPT

(75) Inventor: Martin Boesgaard, Solrød Strand (DK)

(73) Assignee: Codesealer APS, Valby (DK)

( * ) Notice: Subject to any disclaimer, the term of this patent is extended or adjusted under 35 U.S.C. 154(b) by 0 days.

(21) Appl. No.: 12/735,774

(22) PCT Filed: Feb. 18, 2009

(86) PCT No.: PCT/EP2009/051934
§ 371 (c)(1),
(2), (4) Date: Nov. 15, 2010

(87) PCT Pub. No.: WO2009/103742
PCT Pub. Date: Aug. 27, 2009

(65) Prior Publication Data
US 2011/0099629 A1    Apr. 28, 2011

(30) Foreign Application Priority Data

Feb. 18, 2008 (DK) ................ 2008 00220
Jun. 17, 2008 (DK) ................ 2008 00842

(51) Int. Cl.
*G06F 21/00* (2006.01)
(52) U.S. Cl. ............. 726/22; 713/189; 717/127; 705/51
(58) Field of Classification Search ............ 726/22; 705/50–51; 717/127–133; 709/223
See application file for complete search history.

(56) References Cited

U.S. PATENT DOCUMENTS

| 5,903,728 A * | 5/1999 | Semenzato ............ 709/217 |
| 6,275,938 B1 * | 8/2001 | Bond et al. ............. 726/23 |
| 6,735,694 B1 | 5/2004 | Berstis et al. |
| 7,162,715 B1 | 1/2007 | Whittaker et al. |
| 7,457,951 B1 | 11/2008 | Proudler et al. |

FOREIGN PATENT DOCUMENTS

| EP | 1 056 010 | 11/2000 |
| WO | WO 2008/034900 | 3/2008 |

OTHER PUBLICATIONS

International Search Report from PCT/EP2009/051934.
Written Opinion of the International Search Authority for international application No. PCT/EP2009/051934.

* cited by examiner

*Primary Examiner* — Hadi Armouche
(74) *Attorney, Agent, or Firm* — Harness, Dickey & Pierce, p.L.C.

(57) ABSTRACT

A method for detecting if a digital document (e.g. an HTML document) is changed by others than authenticated script code (e.g. JavaScript code) is presented. The method includes loading the authenticated script code into a trusted computer application and storing a snapshot of the digital document in the trusted computer application. Before the authenticated script code is executed, the snapshot of the digital document is compared with the document to verify if the digital document is still authentic. After executing the authenticated script code, the snapshot of the digital document is replaced with an up-to-date copy reflecting eventual changes made to the digital document by the executed script code. The digital document can then at any time be compared with the most recent snapshot to verify if it is authentic.

14 Claims, 12 Drawing Sheets

AUTHENTICATING A WEB PAGE WITH EMBEDDED JAVASCRIPT

FIELD OF THE INVENTION

The method and apparatus of the present invention relate generally to securing network communication and stored data against attacks.

BACKGROUND OF THE INVENTION

The increase in electronic commerce in recent years has also led to a rapid growth in computer crime. In particular, financial transactions over computer networks proved to be a major target of attacks, where the attackers are using a variety of techniques such as phishing. As an example, at the time of this writing, almost all major banks worldwide are under attack by various forms of identity theft, and while the financial losses are significant, the more important danger is that of bank users losing confidence in online banking.

It has become clear that the old recipes for protecting client-server connections over insecure networks (as e.g. user passwords or their combination with one-time passwords) no longer provide the necessary level of security. Attackers use a combination of more and more advanced techniques, such as man-in-the-middle attacks, phishing, DNS spoofing, and malware (e.g. viruses and Trojan horses). In this context, new protection techniques are required to secure financial online transactions.

The present invention can detect attacks on an HTML document when it is sent to the user and when it is shown in the user's browser.

SUMMARY OF THE INVENTION

A first aspect the present invention provides a method of detecting if a digital document with embedded script code has been manipulated by others than the script code embedded into the digital document, the method comprising the steps of:
  loading at least a part of the embedded script code in the digital document into a trusted computer application;
  replacing one or more calls to the embedded script code in the digital document with calls to the trusted application;
  a copy of the digital document (or a part thereof) is stored in the trusted computer application;
  if a call to the trusted application replacing a script code call is invoked, the trusted application will a) compare the digital document (or the part thereof) with the stored copy to determine if the digital document has been manipulated; b) execute the script code that was replaced by the call to the trusted application; c) the copy of the digital document (or the part thereof) stored in the trusted computer application is replaced with an up-to-date copy reflecting eventual changes made to the digital document by the executed script code;
  the digital document is compared with the stored copy to determine if it has been manipulate.

It may thus be ensured that the trusted computer application (e.g. a Java applet) detects if the digital document (e.g. an HTML or XHTML document) is manipulated by others than the script code (e.g. JavaScript) embedded into the digital document. Consequently, the present invention allows improved security in a variety of data transmission applications, in particular Internet transmission of digital data, such as in net-banking systems, Internet shopping sites, public authority web interfaces, Internet-based or Intranet-based order delivery systems, etc. If the trusted computer application is a Java applet, it may execute the script code that was replaced by the call to the trusted application using the eval( ) method of the JSObject class.

The process of comparing the digital document with the stored copy to determine if it has been manipulated may be performed repeatedly, e.g. every time a certain amount of time has elapsed or every time certain events occur.

Instead of storing a copy of the digital document in the trusted application for later comparison, another representation of the digital document may be stored, e.g. a check sum, a hash value, a MAC value. In some applications, it might be relevant to store one or more copies or other representations of parts of the digital document to enable a partial verification.

In one embodiment of the present invention, the digital document is downloaded from a server through a proxy server positioned in front of the server, the method comprises the additional steps of:
  the proxy server stores a check sum, a hash value, a MAC value, or a digital signature representing the digital documents downloaded through the proxy server;
  the trusted computer application computes a check sum, a hash value, a MAC value, or a digital signature representing the downloaded document;
  when a second digital document is requested from a server behind the proxy server, the check sum, hash value, MAC value, or digital signature representing the digital document computed by the trusted computer application is attached to the request;
  the proxy server extracts the check sum, hash value, MAC value, or digital signature representing the digital document from the request and verifies it against the stored check sum, hash value, MAC value, or digital signature representing the digital document to determine if the request for the second digital document came from an authentic copy of the digital document.

The proxy server can thus verify if the digital document was manipulated while being sent to the user's computer or while stored on or viewed on the user's computer. This information can be used to detect if requests from the user or data from the user (i.e. data attacked to the request) origins from an authentic copy of the digital document. The server behind the proxy server may be a web server.

In another embodiment, the proxy server processes the digital document to be downloaded, the method comprises the additional steps of:
  the proxy server extracts embedded script code in the digital document downloaded through the proxy server;
  the proxy server replaces calls to embedded script code in the digital document downloaded through the proxy server with calls to the trusted application;
  the proxy server includes the embedded script code and the calls to the embedded script code in an initialization string that is inserted into the digital document downloaded through the proxy server;
  the trusted computer application loads the initialization string from the digital document and thereby loads the embedded script code and calls to embedded script code to execute if a script code call replaced with a call to the trusted application is invoked.

The proxy server thus takes some of the processing work from the trusted computer application. The initialization string sent to the trusted computer application may further be encrypted and/or authenticated to provide further security.

In one embodiment of the present invention, the trusted application creates a JavaScript object which can act as a container that can contain JavaScript methods and data objects. This JavaScript container can then be used to hold methods and data in a way such that the method and data cannot be accessed by program code with access to the digital document's data objects, since this container is not referenced from the digital document or the reference to the container is hard to obtain.

In one embodiment of the present invention, several JavaScript containers are set up to hold methods and/or data with different security classification and/or related to different browser windows/tabs and/or related to different frames in a frameset.

In one embodiment, the browser fetches the digital documents and triggers an event that makes the trusted computer application process the document when it has been loaded.

In one embodiment, the digital document is fetched by the trusted application and processed (if relevant) when it has been loaded. The fetched or processed digital document is then written to the browser e.g. using the "write" method of the "document" object.

In one embodiment of the present invention, other content than HTML code and JavaScript code, e.g. images, are fetched by the trusted application and processed (if relevant) before being inserted into the document.

In one embodiment of the present invention, the data fetched by the trusted application is authenticated and/or decrypted when it has been loaded.

In one embodiment of the present invention, a shadow copy of the digital document is maintained. The shadow copy is initialized with the digital document downloaded from the web server and all changes carried out by script code (e.g. script code in a JavaScript container) are carried out in the shadow copy. When changes have been made to the shadow copy, the content of the shadow copy is copied to the displayed digital document.

In one embodiment of the present invention, the digital document to be displayed in the user's browser is processed (for example by a proxy server or by the trusted computer application) to extract the script code to be loaded into the trusted computer application. During this processing, special tags or other information in the digital document can define parts of the digital document from where embedded script code should not be expected. If script code is found in these parts of the digital document, appropriate actions may be taken, e.g. not load the script code into the trusted computer application, remove the script code from the digital document, and/or raise an alert.

In one aspect of the present invention, the script code or part thereof is hardcoded into the trusted computer application.

In one aspect of the present invention, the trusted computer application is protected by trusted computing technology including, for example, technology developed and/or defined by the TRUSTED COMPUTING GROUP, or protected by the method described in patent application WO2008034900.

It should be understood that the "proxy server" component may for example be executed on a dedicated server positioned in front of the web server, as a software component running on the web server (e.g. a web server plugin), or as a software component running on the user's computer.

It should be understood that the "Java applet" alternatively may for example be an ActiveX component, an ADOBE FLASH object, a MICROSOFT SILVERLIGHT object, or JavaScript code.

It should be understood that the "JavaScript code" may alternatively be code of another programming language than JavaScript, for example VB-Script.

It should be understood that "digital document" or "HTML document" may alternatively be an HTML document, an XHTML document, a PDF document, a word processor document, or another digital document.

It should be understood that "the browser" may alternatively be another viewer of digital documents, e.g. a PDF viewer, a Flash viewer, or a word processor program.

It should be understood that the "trusted application" may for example include JavaScript code, binary executable program code, Java code, or JavaScript code stored and/or executed in a JavaScript container.

It should be understood that the "web server" may include servers providing access to digital data using any digital communication protocol including HTTP and HTTPS.

It should be understood that processing of digital document or script code may for example be carried out by a proxy server or a trusted computer application.

The following example shows an HTML document being processed by a proxy server and a trusted computer application (in this example a Java applet) according to one aspect of the present invention:

The HTML document as fetched by the proxy server from the web server:

```
<html>
    <head>
        <script src="external.js" type="text/javascript"></script>
        <script type="text/javascript">
            function formValidate( )
            {
                document.TransferForm.Hidden.value = "Repeat:" +
                document.TransferForm.Visible.value;
            }
            function dynamicHtml( )
            {
                target = document.getElementsByName("Visible")[0];
                newItem = document.createElement("input");
                newItem.setAttribute("type", "text");
                newItem.setAttribute("name", "NewVisible");
                newItem.setAttribute("value", "New visible");
                target.parentNode.insertBefore(newItem, target);
            }
        </script>
    </head>
    <body>
        <form action="submit.php" method="get" name="TransferForm" onsubmit="formValidate( )">
            Input field:
            <input type="text" name="Visible">
            <input type="hidden" name="Hidden">
            <br>
            <input type="submit" value="Submit">
        </form>
        <br>
        <a href="javascript:dynamicHtml( )">Add input using authentic code</a><br>
    </body>
</html>
```

The following embedded script code is extracted from the HTML document:

```
function formValidate( )
{
    document.TransferForm.Hidden.value = "Repeat:" +
        document.TransferForm.Visible.value;
}
```

-continued

```
function dynamicHtml( )
{
    target = document.getElementsByName("Visible")[0];
    newItem = document.createElement("input");
    newItem.setAttribute("type", "text");
    newItem.setAttribute("name", "NewVisible");
    newItem.setAttribute("value", "New visible");
    target.parentNode.insertBefore(newItem, target);
}
```

The following references to external script code modules are extracted from the HTML document:
external.js
And the following calls to embedded script code are extracted from the HTML document:
0: formValidate( )
1: dynamicHtml( )

The proxy server will then sent the following HTML document to the user. Notice that "Base64(Encrypt(InitData); Hash(Encrypt(InitData)))" represents the initialization string in encrypted and authenticated form. The parts of the document inserted by the proxy server are marked with underlined and bold text. parent.Static is a static frame containing the Sealed HTML applet.

Script call is looked up in the table of JavaScript calls provided to the applet at load time. So the applet will find this code: dynamicHtml( ).

This code will be analyzed, and the applet realizes that it depends on the function dynamicHtml( ) in the embedded script code provided to the applet at load time. Thus, the string is prepended with the declaration of this function. This processing is performed recursively in case the found function relies on other functions.

The resulting string to be executed by JSObject.eval( ) is:

```
function dynamicHtml( )
{
    target = document.getElementsByName("Visible")[0];
    newItem = document.createElement("input");
    newItem.setAttribute("type", "text");
    newItem.setAttribute("name", "NewVisible");
    newItem.setAttribute("value", "New visible");
    target.parentNode.insertBefore(newItem, target);
}
dynamicHtml( )
```

In a setup with JavaScript container: The extracted script code is evaluated in the container in order to insert it into the

```
<html>
    <head>
        <script type="text/javascript">
            function authLoad()
            {
                loadString= "Base64(Encrypt(InitData);
                Hash(Encrypt(InitData)))";
                parent.Static.Applet.load(loadString);
            }
            functionauthUnload()
            {
                parent.Static.Applet.unload();
            }
            function authExec(index)
            {
                parent.Static.Applet.exec(index);
            }
        </script>
    </head>
    <body onload="authLoad()" onunload="authUnload()">
        <form action="submit.php" method="get" name="TransferForm" onsubmit="authExec(0)">
            Input field:
            <input type="text" name="Visible">
            <input type="hidden" name="Hidden">
            <br>
            <input type="submit" value="Submit">
        </form>
        <br>
        <a href="javascript:authExec(1)">Add input using authentic code</a><br>
    </body>
</html>
```

In a setup without JavaScript container: The following illustrates what happens when authExec(1) is invoked. The local JavaScript function authExec(index) forwards the call to the applet's exec(index) function. In the applet, The Java-container. Similarly, external references are loaded and evaluated and easily identifiable methods are inserted for each script code call extracted from the HTML document.

The two script code calls from the example could be inserted into the container object by evaluating the following:

```
function invoke000( ) {formValidate( )}
function invoke001( ) {dynamicHtml( )}
```
When the applet's method authExec(1) is invoked, the applet simply calls invoke001( ) in the JavaScript container.

The following example shows simplified Java program code for setting up a JavaScript container object:

```
import netscape.javascript.*;
class JavaScriptContainer
{
    private JSObject container;
    public void setupContainer(JSObject hostWindow)
    {
        container = (JSObject)hostWindow.eval("new Object");
    }
    public Object eval(String jsCode)
    {
        return container.eval(jsCode);
    }
    public Object call(String methodName, Object args[ ])
    {
        return container.call(methodName, args);
    }
}
```

JavaScript methods and data objects can be inserted into the container object using the "eval" method.

BRIEF DESCRIPTION OF THE DRAWINGS

Example embodiments will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1:
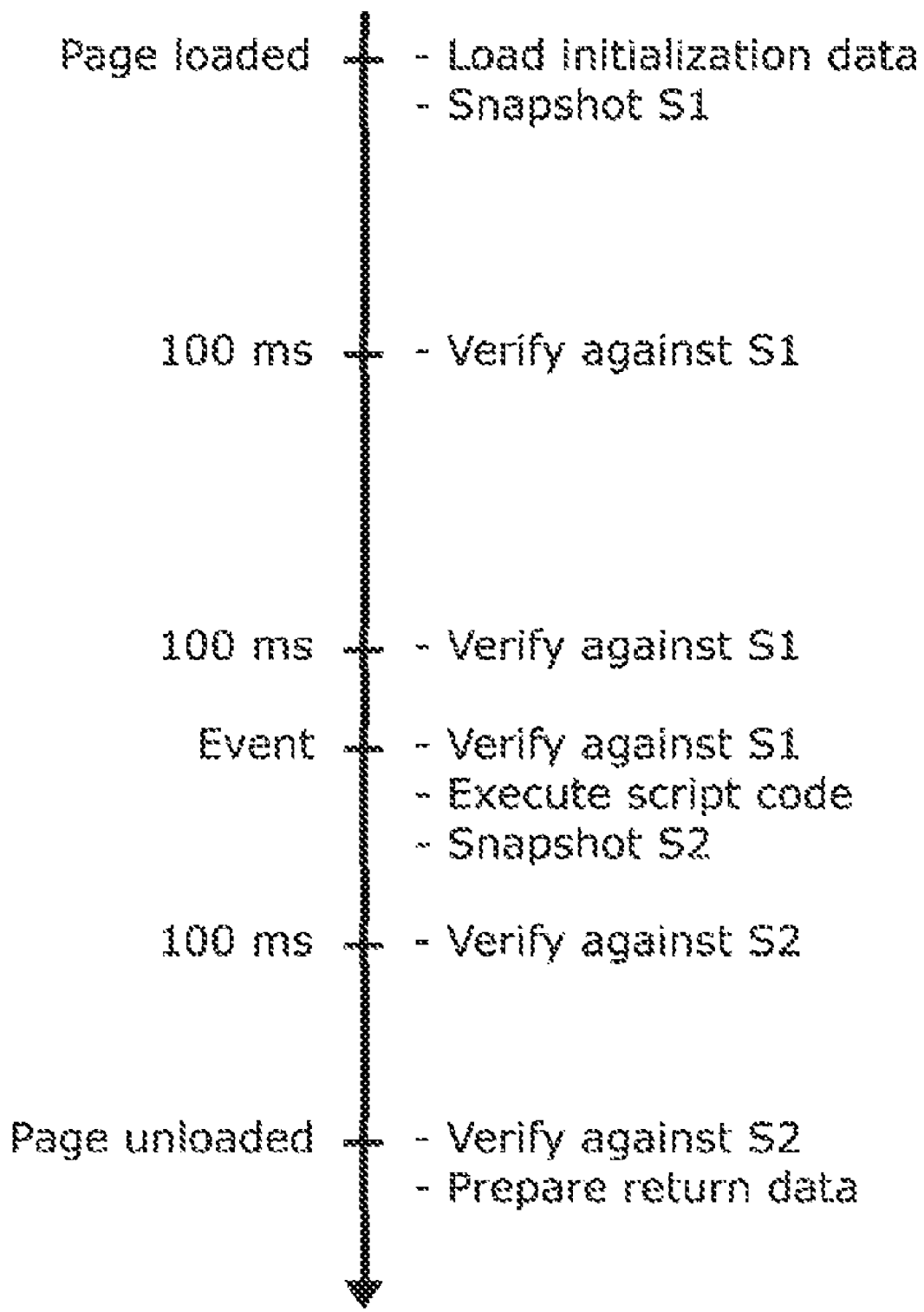
FIG. 1 illustrates an example of a timeline as seen from a trusted application's point of view.

FIG. 1 illustrates an example of a timeline as seen from the trusted application's point of view. When an event (e.g. due to a user action) is triggered, the trusted application starts by verifying if the digital document matches the latest snapshot (Snapshot S1). Hereafter, the requested script code (e.g. JavaScript code) is executed. Finally, a new snapshot (Snapshot S2) is taken such that subsequent verification will be against the resulting digital document. Every 100 millisecond, the digital document is verified by comparing it to the latest snapshot. When the page is unloaded, the digital document is verified for the last time and return data to be sent to the proxy server is prepared and included in the request for the next digital document.

Figure 2:
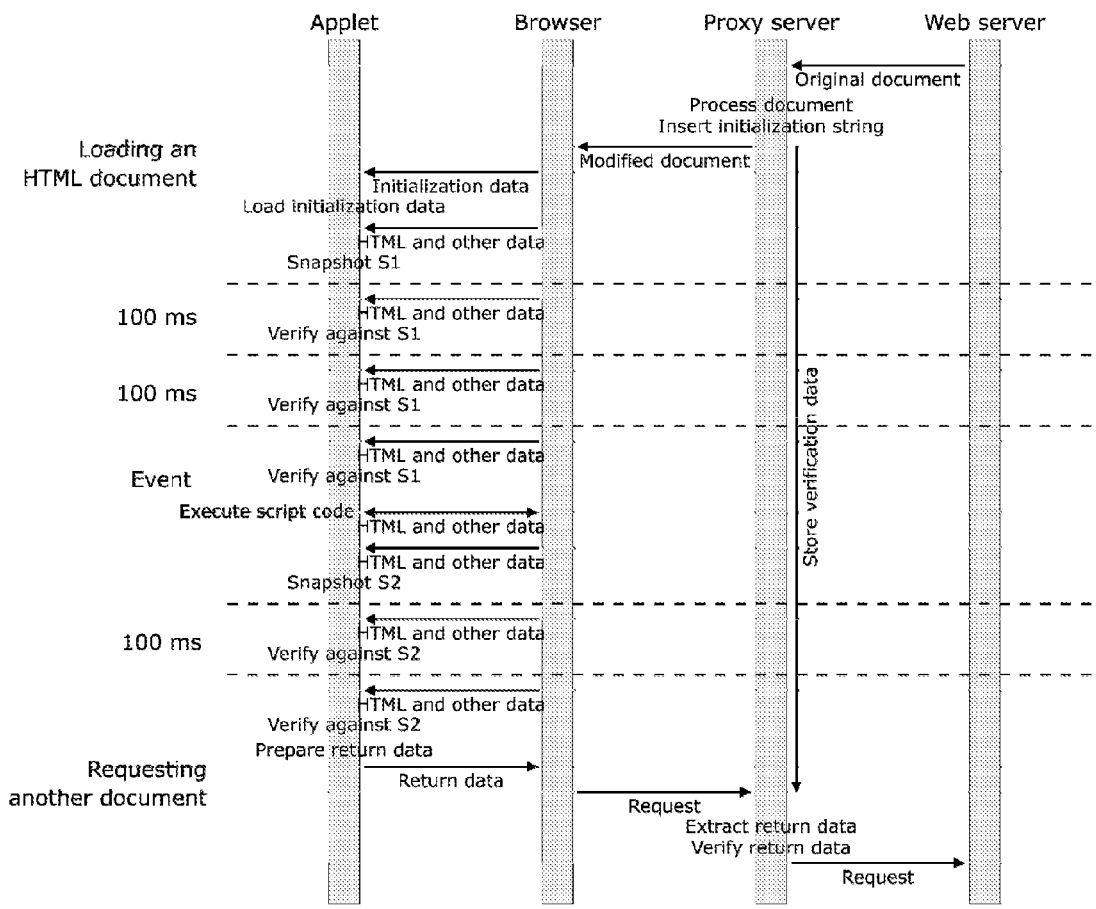
FIG. 2 illustrates the data flow associated with the time line illustrated in FIG. 1.

FIG. 2 illustrates the data flow of FIG. 1. In some aspects of the present invention, the proxy server is omitted. As is illustrated in FIG. 2 a web server sends an original document to the proxy server. The proxy server processes the document, inserts an initialization string, stores verification data and sends a modified document to a browser which sends initialization data to an applet. As is described above with respect to FIG. 1, When an event (e.g. due to a user action) is triggered, the trusted application starts by verifying if the digital document matches the latest snapshot, Snapshot 1. Every 100 milliseconds, the digital document is verified by comparing it to Snapshot 1. Hereafter, the requested script code (e.g. JavaScript code) is executed. Finally, a new snapshot, Snapshot 2, is taken such that subsequent verification will be against the resulting digital document every 100 millisecond. When the page is unloaded, the digital document is verified for the last time and return data to be sent to the proxy server via the browser is prepared and included in the request for the next digital document. The proxy server extracts the return data, verifies the return data and forwards the request to the Web server.

Figure 3:
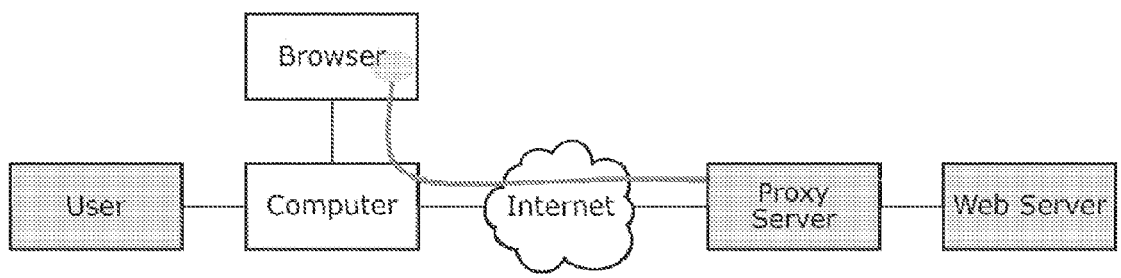
FIG. 3 illustrates a setup with a user communicating with a web server over the internet using his web browser.

FIG. 3 illustrates a setup with a user communicating with a web server over the internet using his web browser. A proxy server is inserted in front of the web server. The proxy server communicates with a trusted application (e.g. a Java applet) running in the user's browser. The user's browser is running on the user's computer which is being operated by the user. The green objects can be considered secure. The user's computer, the user's browser, the Internet, and the links between them may be under the attacker's control.

In some setups, the proxy server may be a software components running on the same computer as the browser or on the same computer as the web server. In other setups, the proxy may not be included at all.

Figure 4:
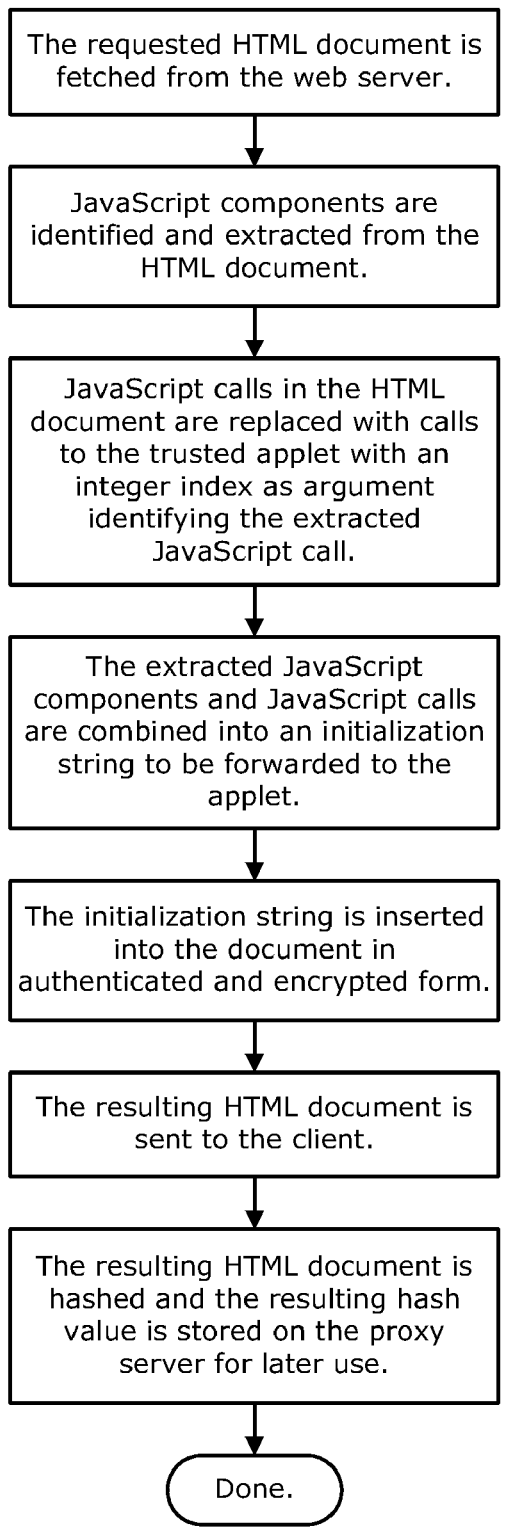
FIG. 4 illustrates steps performed by the proxy server when sending a digital document to a user.

FIG. 4 illustrates the steps performed by the proxy server when sending a digital document (e.g. an HTML document) to the user. The steps are:

The requested HTML document is fetched from the web server.

JavaScript components are identified and extracted from the HTML document.

JavaScript calls in the HTML document are replaced with calls to the trusted applet with an integer index (or another kind of identification) as argument identifying the extracted JavaScript call.

The extracted JavaScript components and JavaScript calls are combined into an initialization string to be forwarded to the applet.

The initialization string is inserted into the document in authenticated and encrypted form.

The resulting HTML document is sent to the client.

The resulting HTML document is hashed and the resulting hash value is stored on the proxy server for later use.

Figure 5:
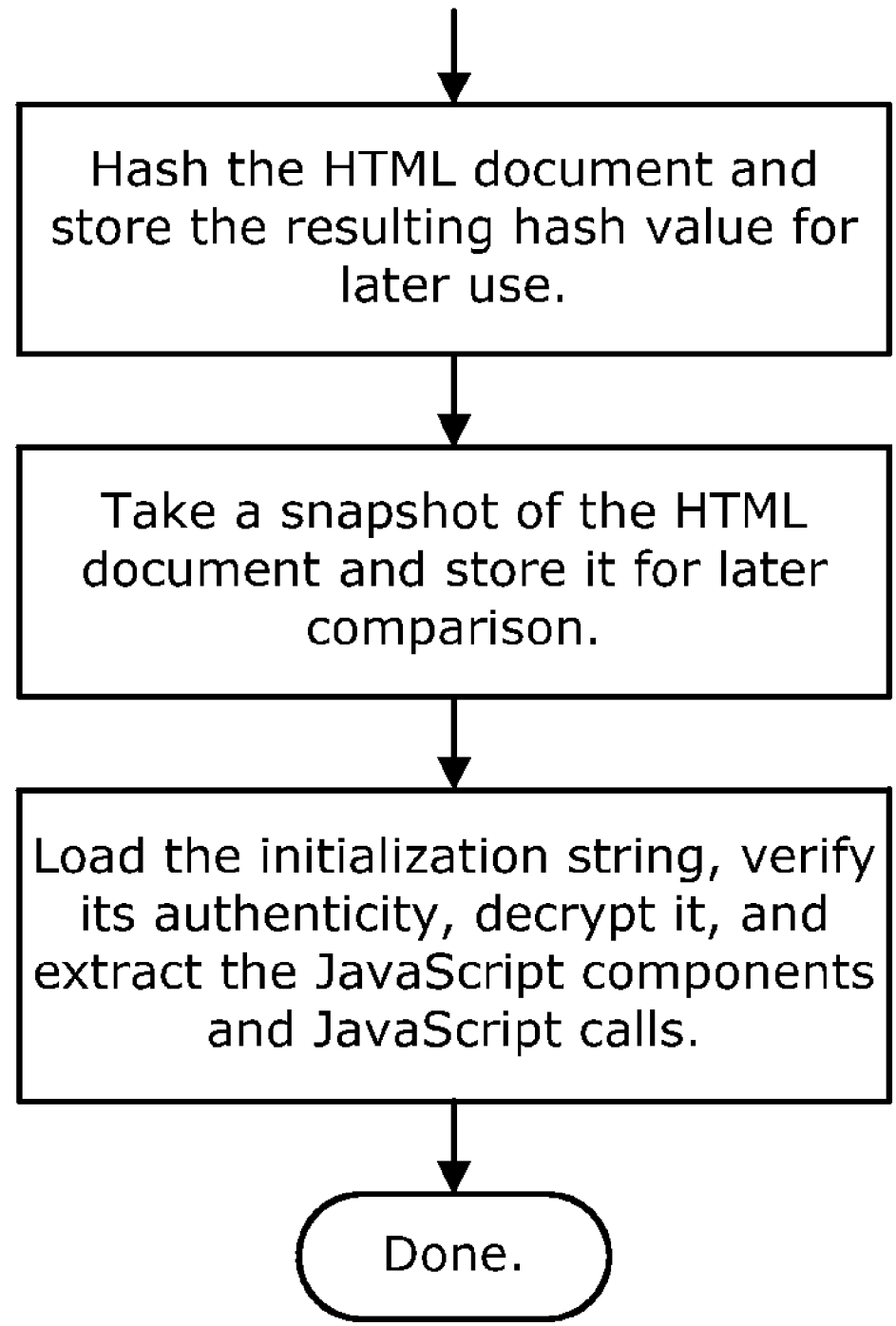
FIG. 5 illustrates steps performed by a trusted application when a digital document has been loaded.

FIG. 5 illustrates the steps performed by the trusted application when the digital document has been loaded. The steps are:

Hash the HTML document and store the resulting hash value for later use.

Take a snapshot of the HTML document and store it for later comparison.

Load the initialization string, verify its authenticity, decrypt it, and extract the JavaScript components and JavaScript calls.

The digital document can for example be loaded by the browser where the trusted application is notified when the document has been loaded or be loaded by the trusted application itself. In the latter case, the digital document can be written by the trusted application to the browser e.g. using the "write" method in the browser's "document" object.

Figure 6:
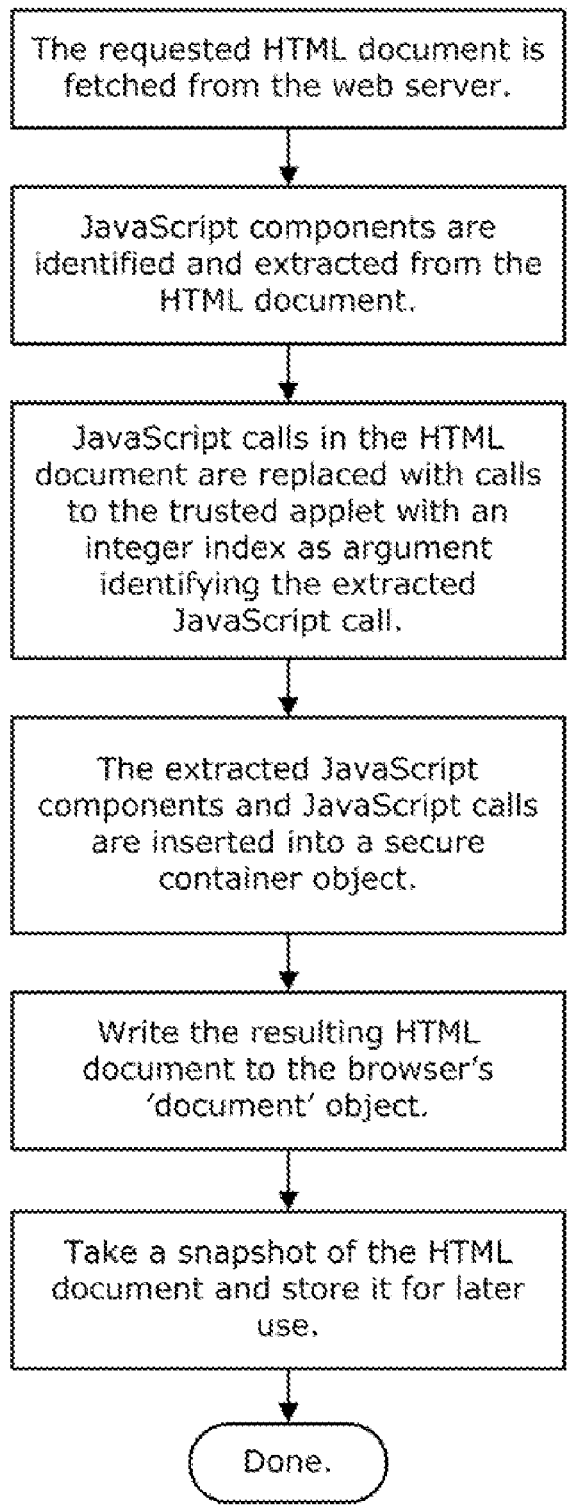
FIG. 6 illustrates steps performed by a trusted application with JavaScript container when loading a digital document.

FIG. 6 illustrates the steps performed by the trusted application with JavaScript container when loading a digital document. The steps are:

The requested HTML document is fetched from the server (e.g. a proxy server or a web server). The HTML document may have been pre-processed to identify JavaScript components.

JavaScript components are identified and extracted from the HTML document.

JavaScript calls in the HTML document are replaced with calls to the trusted applet with an integer index (or another kind of identification) as argument identifying the extracted JavaScript call.

The extracted JavaScript components and JavaScript calls are inserted into a secure container object.

Write the resulting HTML document to the browser's 'document' object.

Take a snapshot of the HTML document and store it for later use.

Figure 7:
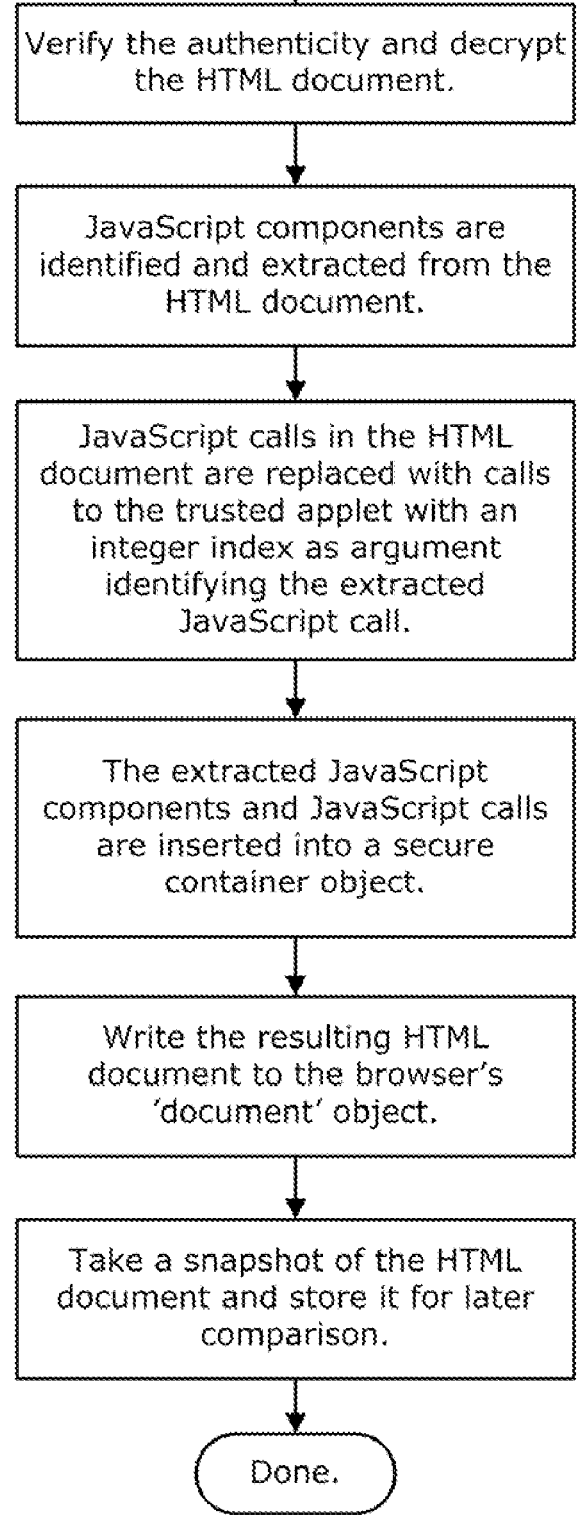
FIG. 7 illustrates steps performed by the trusted application with JavaScript container when loading a digital document.

FIG. 7 illustrates the steps performed by the trusted application with JavaScript container when loading a digital document. The steps are:

Verify the authenticity and decrypt the digital document.

JavaScript components are identified and extracted from the HTML document.

JavaScript calls in the HTML document are replaced with calls to the trusted applet with an integer index (or another kind of identification) as argument identifying the extracted JavaScript call.

The extracted JavaScript components and JavaScript calls are inserted into a secure container object.

Write the resulting HTML document to the browser's 'document' object.

Take a snapshot of the HTML document and store it for later comparison.

Figure 8:
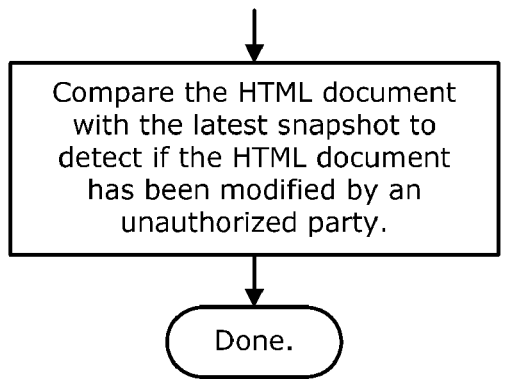
FIG. 8 illustrates the step performed by the trusted application every time a certain amount of time has elapsed.

FIG. 8 illustrates the step performed by the trusted application every time a certain amount of time (e.g. 100 milliseconds) has elapsed. The step is:

Compare the HTML document with the latest snapshot to detect if the HTML document has been modified by an unauthorized party.

Figure 9:
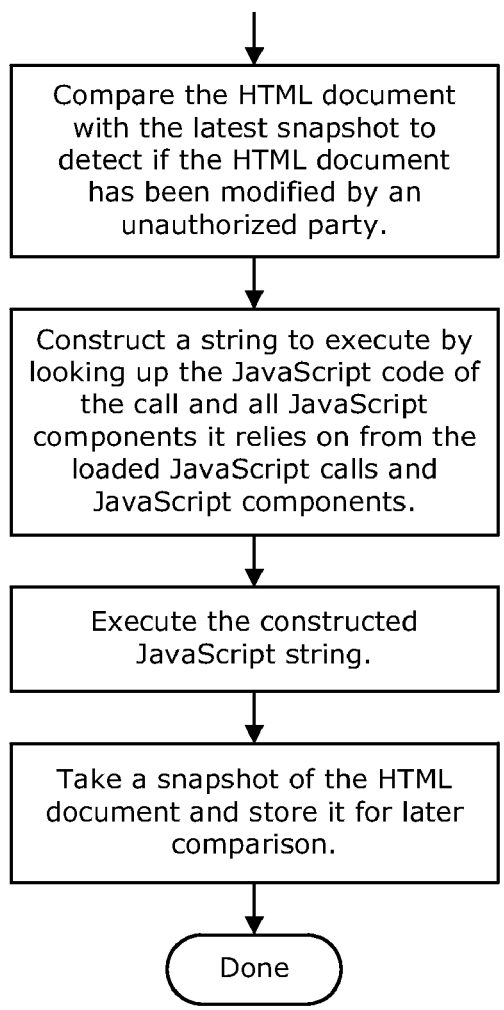
FIG. 9 illustrates the steps performed by the trusted application when script code in the digital document replaced by a call to the trusted application is invoked.

FIG. 9 illustrates the steps performed by the trusted application when script code in the digital document replaced by a call to the trusted application is invoked. The steps are:

Compare the HTML document with the latest snapshot to detect if the HTML document has been modified by an unauthorized party.

Construct a string to execute by looking up the JavaScript code of the call and all JavaScript components it relies on from the loaded JavaScript code and JavaScript components.

Execute the constructed JavaScript string.

Take a snapshot of the HTML document and store it for later comparison.

Figure 10:
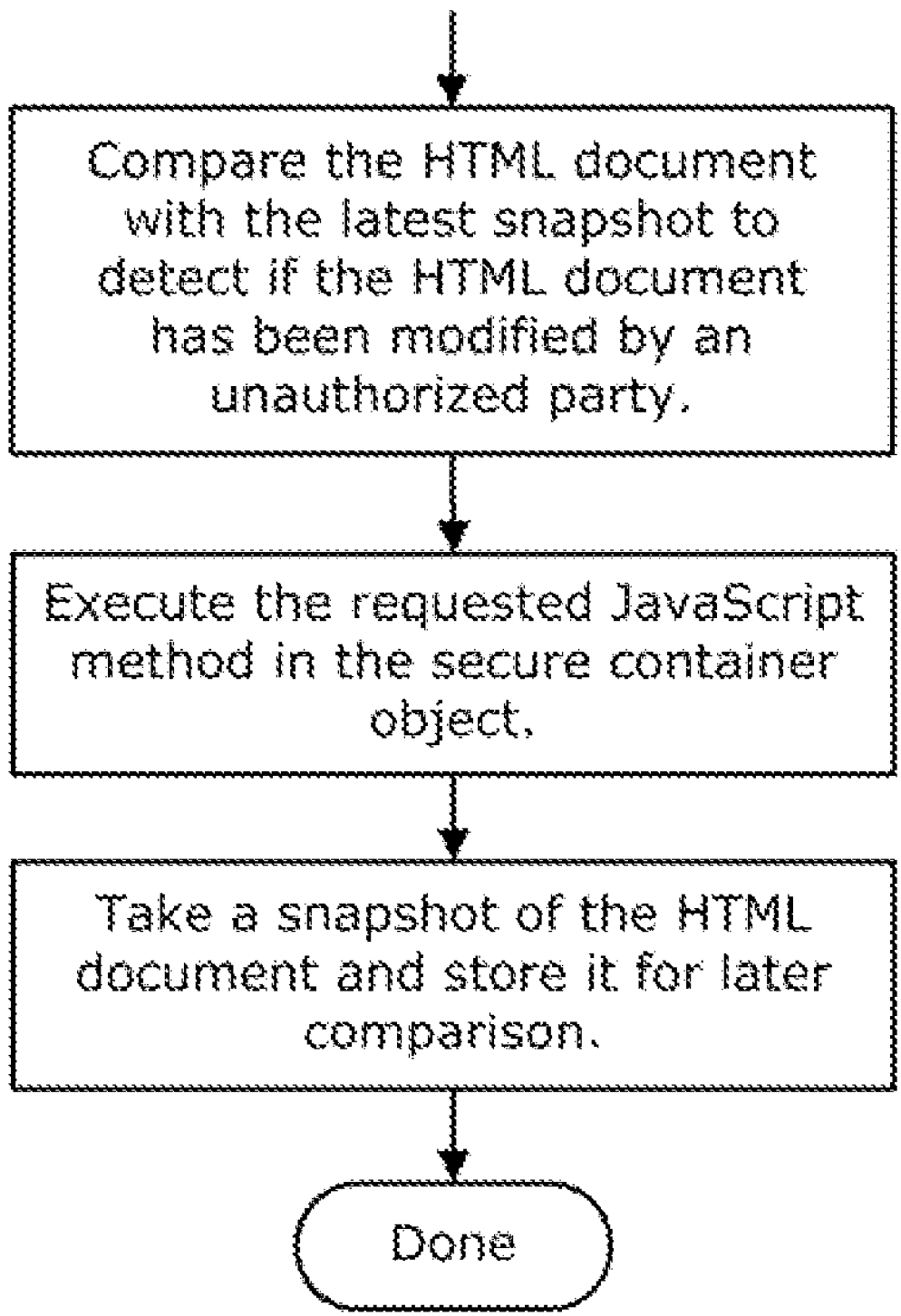
FIG. 10 illustrates the steps performed by the trusted application when script code in the digital document replaced by a call to the trusted application is invoked.

FIG. 10 illustrates the steps performed by the trusted application when script code in the digital document replaced by a call to the trusted application is invoked. The steps are:

Compare the HTML document with the latest snapshot to detect if the HTML document has been modified by an unauthorized party.

Execute the requested JavaScript code in the secure container object.

Take a snapshot of the HTML document and store it for later comparison.

Figure 11:
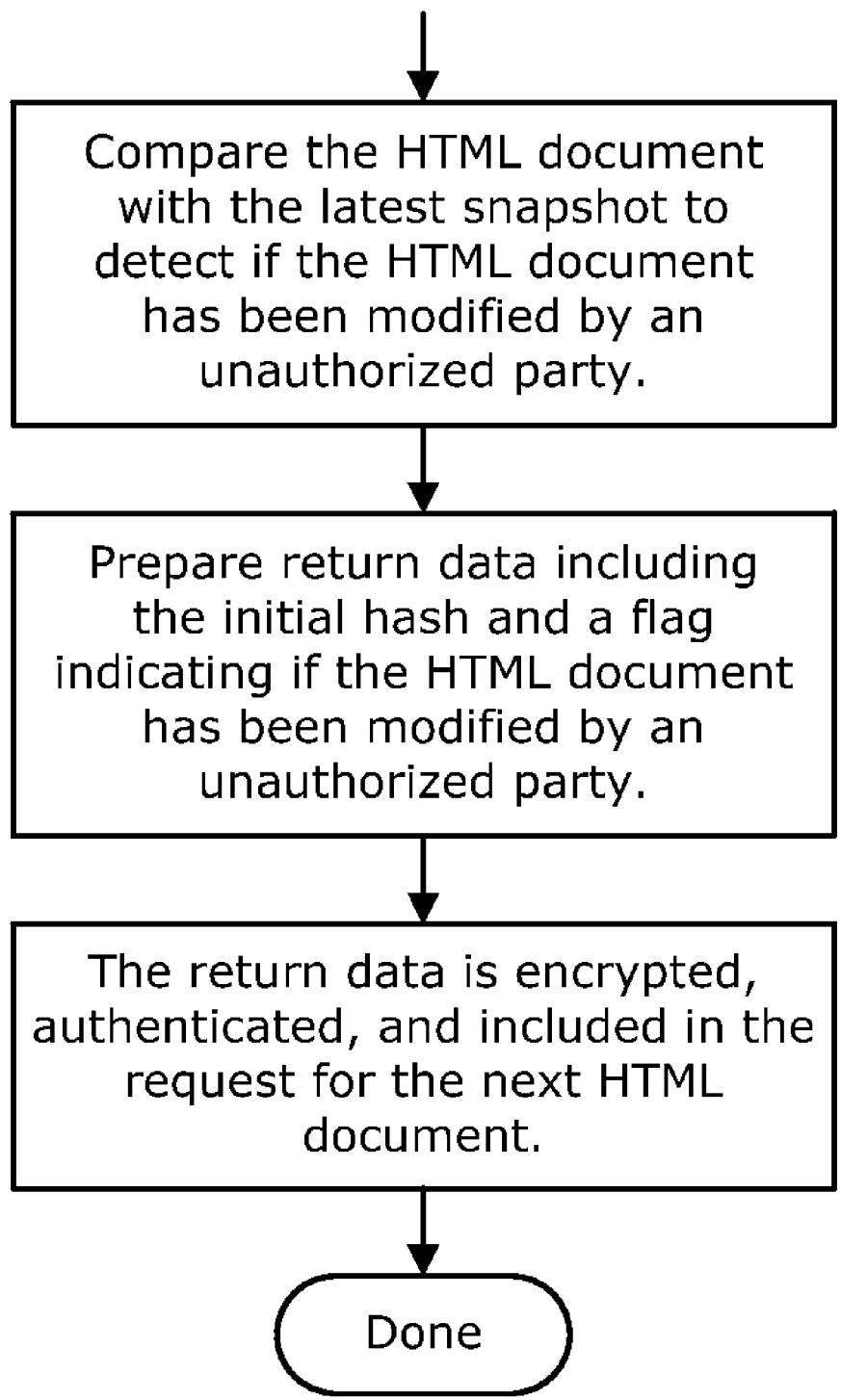
FIG. 11 illustrates the steps performed by the trusted application when the digital document is unloaded.

FIG. 11 illustrates the steps performed by the trusted application when the digital document is unloaded. The steps are:

Compare the HTML document with the latest snapshot to detect if the HTML document has been modified by an unauthorized party.

Prepare return data including the initial hash and a flag indicating if the HTML document has been modified by an unauthorized party.

The return data is encrypted, authenticated, and included in the request for the next HTML document.

Figure 12:
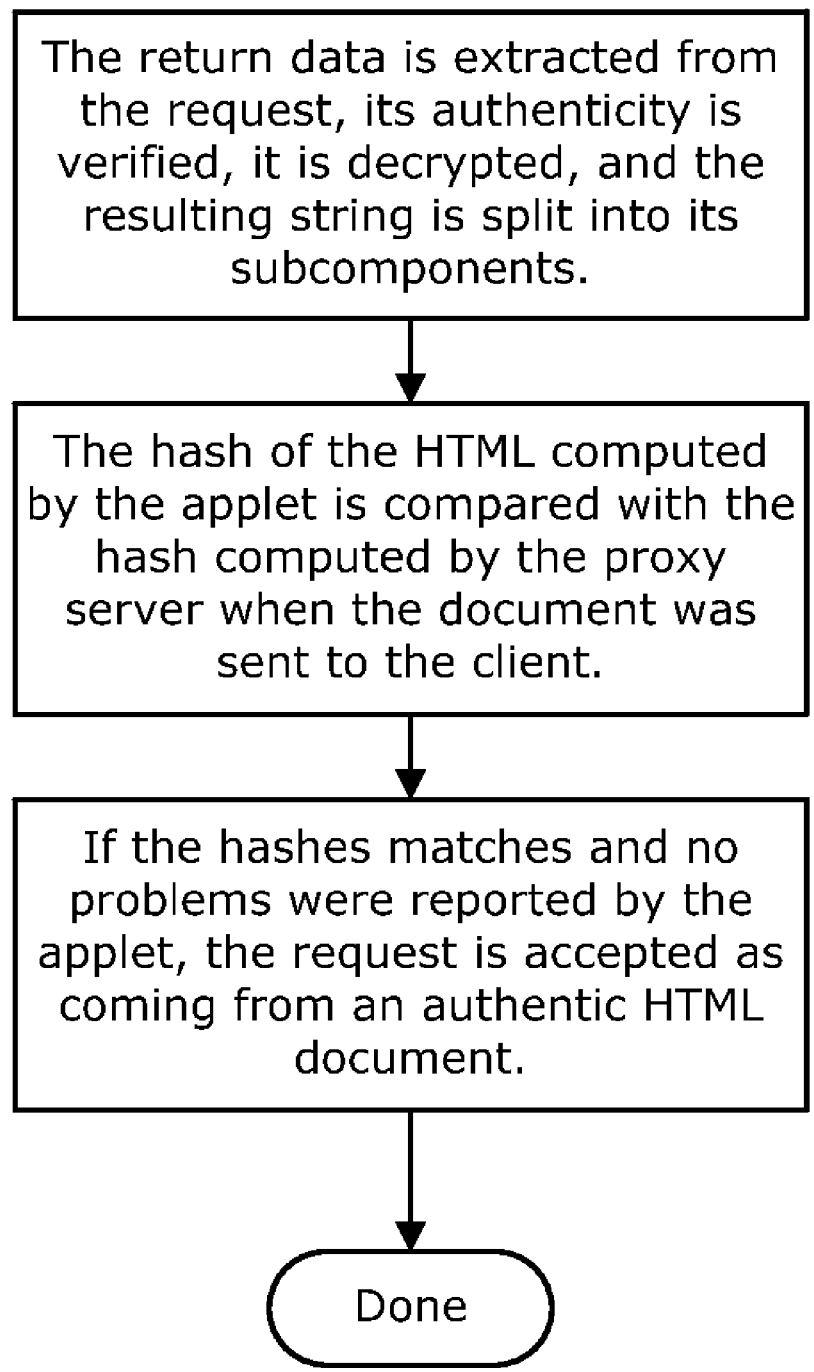
FIG. 12 illustrates the steps performed by the proxy server when it receives a request for another digital document to verify if the request came from an authentic digital document.

FIG. 12 illustrates the steps performed by the proxy server when it receives a request for another digital document to verify if the request came from an authentic digital document. The steps are as follows:

The return data is extracted from the request, its authenticity is verified, it is decrypted, and the resulting string is split into its subcomponents.

The hash of the HTML computed by the applet is compared with the hash computed by the proxy server when the document was sent to the client.

If the hashes matches and no problems were reported by the applet, the request is accepted as coming from an authentic HTML document.

Figure 13:
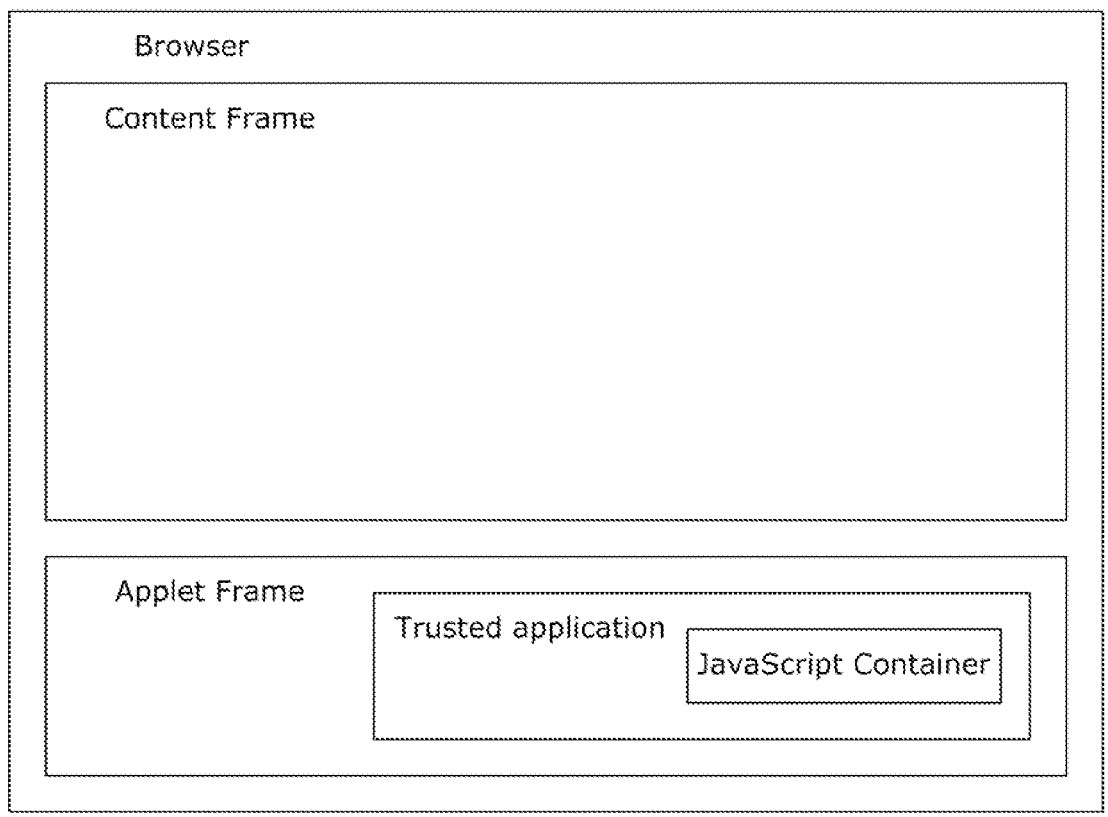
FIG. 13 illustrates a browser with a frameset, a trusted application, and a JavaScript container inside the trusted application.

FIG. 13 illustrates a browser with a frameset, a trusted application, and a JavaScript container inside the trusted application.

The browser shows a frameset with two frames: The content frame and the applet frame.

The content frame contains the content to be shown to the user.

The applet frame contains the trusted application. The applet frame can be hidden to the user (e.g. being zero pixels high or wide).

The trusted application manages one or more JavaScript container objets.

Figure 14:
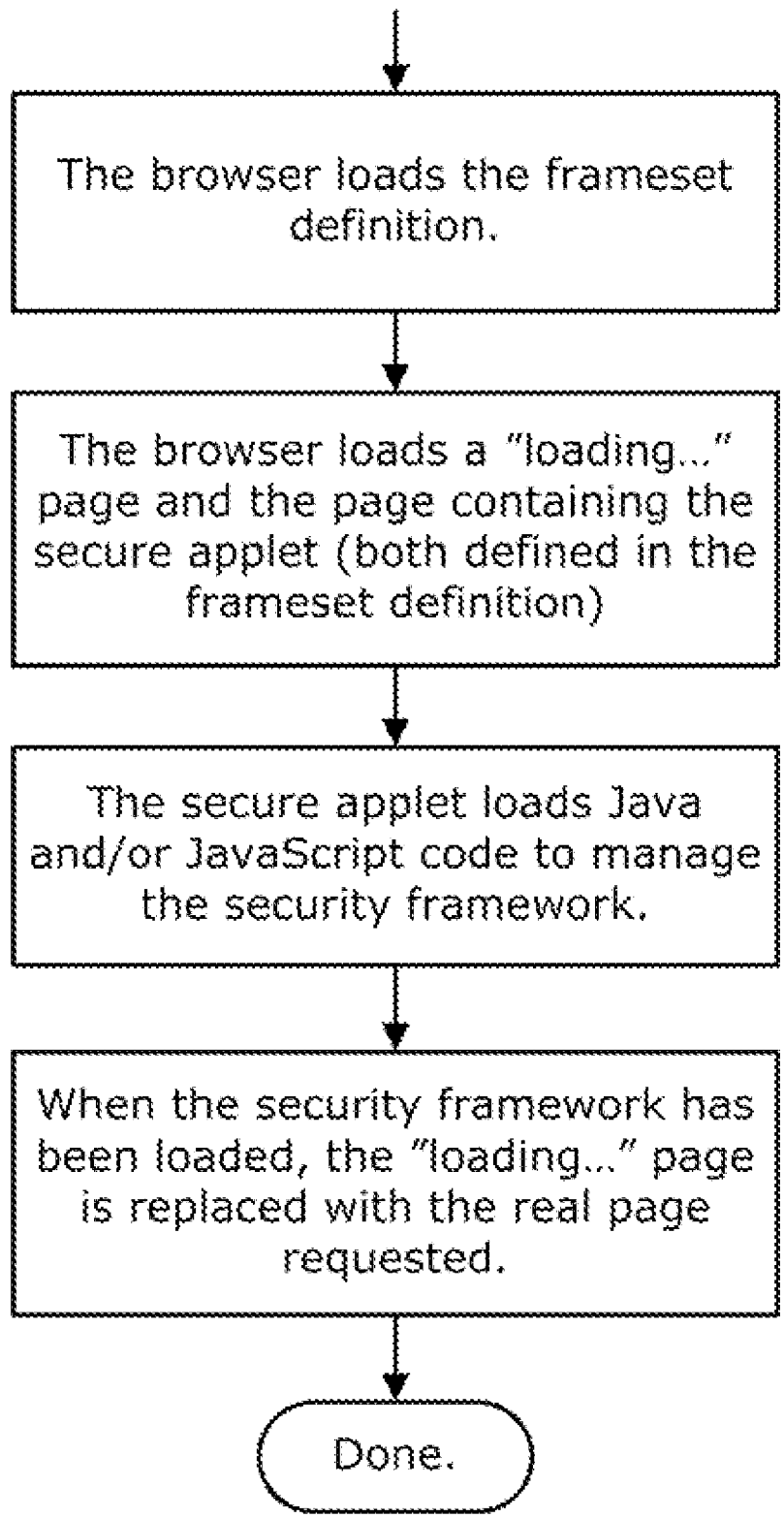
FIG. 14 illustrates a procedure for booting a web page with a trusted application with a JavaScript container object.

FIG. 14 illustrates a procedure for booting (i.e. starting up) a web page with a trusted application with a JavaScript container object. The steps are as follows:

The browser loads the frameset definition.

The browser loads a "loading . . . " page and the page containing the trusted application (both defined in the frameset definition).

The secure applet sets up one or more JavaScript containers and loads Java and/or JavaScript code to manage the security framework.

When the security framework has been loaded, the real start page replaces the "loading . . . " page.

It should be understood that the present invention is not limited to the subject-matter of the appended claims. In particular, the embodiments outlined below form part of the present invention:

1. A method of detecting if a digital document with embedded script code has been manipulated by others than the script code embedded into the digital document, the method comprising the steps of:
    loading at least a part of the embedded script code in the digital document into a trusted computer application;
    replacing one or more calls to the embedded script code in the digital document with calls to the trusted application;
    a copy of the digital document is stored in the trusted computer application;
    if a call to the trusted application replacing a script code call is invoked, the trusted application will a) compare the digital document with the stored copy to determine if the digital document has been manipulated; b) execute the script code that was replaced by the call to the trusted application; c) the copy of the digital document stored in the trusted computer application is replaced with an up-to-date copy reflecting eventual changes made to the digital document by the executed script code;
    the digital document is compared with the stored copy to determine if it has been manipulate.

2. A method according to embodiment 1 where the digital document is downloaded from a server through a proxy server positioned in front of the server, the method comprises the additional steps of:
    the proxy server stores a check sum, a hash value, a MAC value, or a digital signature representing the digital documents downloaded through the proxy server;
    the trusted computer application computes a check sum, a hash value, a MAC value, or a digital signature representing the downloaded document;
    when a second digital document is requested from a server behind the proxy server, the check sum, hash value, MAC value, or digital signature representing the digital document computed by the trusted computer application is attached to the request;
    the proxy server extracts the check sum, hash value, MAC value, or digital signature representing the digital document from the request and verifies it against the stored check sum, hash value, MAC value, or digital signature representing the digital document to determine if the request for the second digital document came from an authentic copy of the digital document.

3. A method according to embodiment 2 where the proxy server processes the digital document to be downloaded, the method comprises the additional steps of:
    the proxy server extracts embedded script code in the digital document downloaded through the proxy server;
    the proxy server replaces calls to embedded script code in the digital document downloaded through the proxy server with calls to the trusted application;
    the proxy server includes the embedded script code and the calls to the embedded script code in an initialization string that is inserted into the digital document downloaded through the proxy server;
    the trusted computer application loads the initialization string from the digital document and thereby loads the embedded script code and calls to embedded script code to execute if a script code call replaced with a call to the trusted application is invoked.

4. A method according to embodiment 3 where the initialization string is encrypted or authenticated by the proxy server and decrypted or verified by the trusted computer application.

5. A method according to any of the preceding embodiments where the digital document repeatedly is compared with the stored copy to determine if the digital document has been manipulated.

6. A method of preventing access to embedded script code in a digital document being viewed by creating a script code data object in a trusted computer application which can act as a container that can contain at least one of a) embedded script code methods, and b) embedded script code data objects, at least a part of the embedded script code in the digital document is inserted into the container.

7. A method according to any of embodiments 1-5 of detecting if a digital document with embedded script code has been modified by using a method according to embodiment 6 to prevent access to the embedded script code extracted from the digital document.

8. A method according to any of the preceding embodiments where the digital document is fetched by the trusted computer application and then forwarded to a viewer computer program to be viewed to a user.

9. A method according to embodiment 8 where the fetched digital document is fetched from a server over a network.

10. A method according to any of embodiments 8-9 where the viewer computer program is a web browser.

11. A method according to any of embodiments 8-10 where the digital document after being fetched but before being forwarded to the viewer computer program is at least one of a) authenticated and b) decrypted.

12. A method according to any of embodiments 8-11 where a digital document is fetched as several subcomponents, at least one part of said digital document is fetched by the trusted computer program.

13. A method according to any of the preceding embodiments where a shadow copy is maintained of a digital document being viewed in a viewer computer program, modifications of the digital document by embedded script code are conducted to the shadow copy, hereafter the content of the shadow copy is copied to the viewed copy of the digital document to make the changes appear in the viewer computer program.

14. A method according to any of the preceding embodiments where the digital document containing embedded script code has at least one section marked as being without embedded script code. Any embedded script code in this at least one section will not be loaded into the trusted computer application.

15. A method according to embodiment 14 where embedded script code in the at least one section is removed from the digital document.

The invention claimed is:

1. A method of detecting if a digital document with embedded script code has been manipulated by a party or entity other than the script code embedded into the digital document, the method comprising the steps of:
    loading at least a part of the embedded script code in the digital document into a trusted computer application;
    replacing one or more calls to the embedded script code in the digital document with calls to the trusted application;
    storing a copy of at least a part of the digital document in the trusted computer application;
    when a call to the trusted application replacing the embedded script code call is invoked, causing the trusted application to a) compare the digital document with the stored copy to determine if the digital document has been manipulated; b) execute the embedded script code that was replaced by the call to the trusted application; and c) replace the copy of the digital document stored in the trusted computer application with an up-to-date copy reflecting possible changes made to the digital document by the executed embedded script code;

comparing the digital document with the stored copy to determine if it has been manipulated.

2. A method according to claim 1 where the digital document is downloaded from a server through a proxy server positioned in front of the server, the method comprising the additional steps of:

the proxy server stores a check sum, a hash value, a MAC value, or a digital signature representing the digital document downloaded through the proxy server;

the trusted computer application computes a check sum, a hash value, a MAC value, or a digital signature representing the downloaded document;

when a second digital document is requested from a server behind the proxy server, the check sum, hash value, MAC value, or digital signature representing the digital document computed by the trusted computer application is attached to the request;

the proxy server extracts the check sum, hash value, MAC value, or digital signature representing the digital document from the request and verifies it against the stored check sum, hash value, MAC value, or digital signature representing the digital document to determine if the request for the second digital document came from an authentic copy of the digital document.

3. A method according to claim 2 where the proxy server processes the digital document to be downloaded, wherein said steps of loading and replacing include the following steps performed by the proxy server and the trusted computer application:

the proxy server extracts at least a part of the embedded script code in the digital document downloaded through the proxy server;

the proxy server replaces calls to embedded script code in the digital document downloaded through the proxy server with calls to the trusted application;

the proxy server includes the embedded script code and the calls to the embedded script code in an initialization string that is inserted into the digital document downloaded through the proxy server;

the trusted computer application loads the initialization string from the digital document and thereby loads the embedded script code and calls to embedded script code to execute if a script code call replaced with a call to the trusted application is invoked.

4. A method according to claim 3 where the initialization string is encrypted or authenticated by the proxy server and decrypted or verified by the trusted computer application.

5. A method according to claim 1 where the digital document repeatedly is compared with the stored copy to determine if the digital document has been manipulated.

6. A method of detecting if a digital document with embedded script code has been modified and of preventing access to the embedded script code in the digital document, comprising the steps of:

loading at least a part of the embedded script code in the digital document into a trusted computer application;

replacing one or more calls to the embedded script code in the digital document with calls to the trusted application;

storing a copy of at least a part of the digital document in the trusted computer application;

when a call to the trusted application replacing the embedded script code call is invoked, causing the trusted application to a) compare the digital document with the stored copy to determine if the digital document has been manipulated; b) execute the embedded script code that was replaced by the call to the trusted application; and c) replace the copy of the digital document stored in the trusted computer application with an up-to-date copy reflecting possible changes made to the digital document by the executed embedded script code;

comparing the digital document with the stored copy to determine if the digital document has been modified; and preventing access to the embedded script code in the digital document when the digital document has been modified.

7. A method according to claim 1 where the digital document is fetched by the trusted computer application and then forwarded to a viewer computer program to be viewed to a user.

8. A method according to claim 7 where the fetched digital document is fetched from a server over a network.

9. A method according to claim 7 where the viewer computer program is a web browser.

10. A method according to claim 7 where the digital document after being fetched but before being forwarded to the viewer computer program is at least one of a) authenticated and b) decrypted.

11. A method according to claim 7 where a digital document is fetched as several subcomponents, at least one part of said digital document is fetched by the trusted computer program.

12. A method according to claim 1, comprising the further step of storing a digital document being viewed in a viewer computer program in a shadow copy, and applying modifications caused by an embedded script code to the shadow copy, and subsequently copying the shadow copy to the viewed copy of the digital document to make the changes caused by the embedded script code appear in the viewer computer program.

13. A method according to claim 1 where the digital document containing embedded script code has at least one section marked as being without embedded script code, and wherein said at least one marked section is omitted from the step of loading at least a part of the embedded script code in the digital document into a trusted computer application.

14. A method according to claim 13, comprising the further step of removing possible embedded script code in the at least one marked section from the digital document.

* * * * *